July 3, 1962 W. T. RENTSCHLER 3,041,948
PHOTOGRAPHIC CAMERA HAVING AUTOMATIC DIAPHRAGM SETTING
Filed May 31, 1960 3 Sheets-Sheet 1

INVENTOR
Waldemar T. Rentschler
By March, Gillette, Virgil & Eslinger
Attorneys

INVENTOR
Waldemar T. Rentschler
By
March, Gillette, Virgil & Eslinger
Attorneys

July 3, 1962 W. T. RENTSCHLER 3,041,948
PHOTOGRAPHIC CAMERA HAVING AUTOMATIC DIAPHRAGM SETTING
Filed May 31, 1960 3 Sheets-Sheet 3
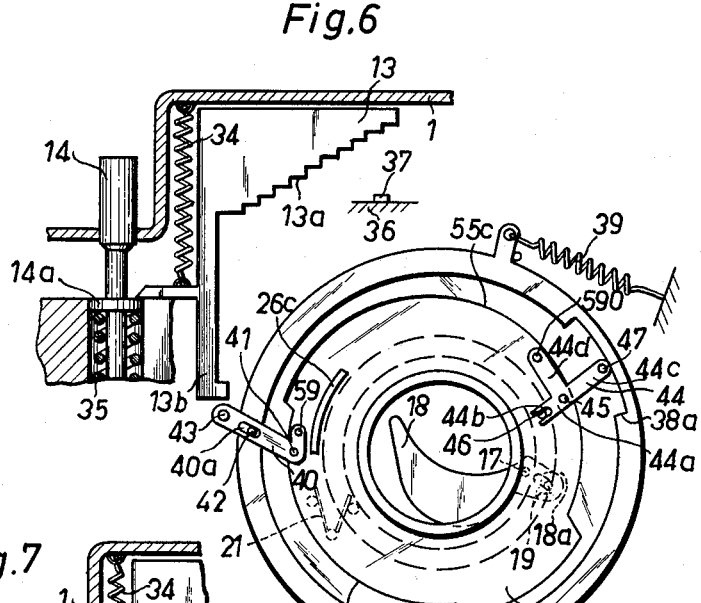
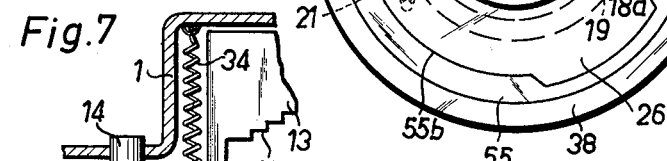
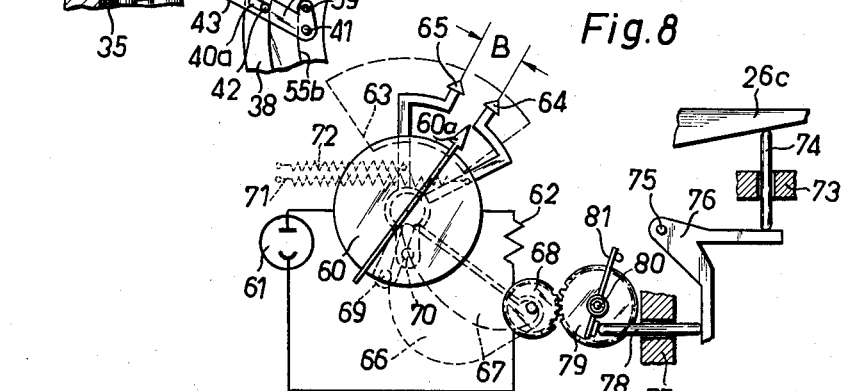
INVENTOR
Waldemar T. Rentschler
By
March, Gillette, Virgil + Eslinger
Attorneys

United States Patent Office 3,041,948
Patented July 3, 1962

3,041,948
PHOTOGRAPHIC CAMERA HAVING AUTOMATIC DIAPHRAGM SETTING
Waldemar T. Rentschler, Calmbach (Enz), Germany, assignor to Alfred Gauthier, G.m.b.H., Calmbach (Enz), Germany, a corporation of Germany
Filed May 31, 1960, Ser. No. 32,871
Claims priority, application Germany May 30, 1959
9 Claims. (Cl. 95—10)

This invention relates to photographic cameras of the type wherein an automatic setting of the diaphragm is effected in response to operation of an exposure regulator, this being accomplished by actuation of the diaphragm mechanism by connection of an operating member thereof with a driving member of said regulator.

A technical object of the invention is to provide a novel and improved photographic camera of the above type, wherein additional exposure factors, other than the diaphragm adjustment, can be taken into consideration in a simple and economical manner, and wherein more particularly the settings for the last-named factors imposes no special requirements on the mode of operation of and method of utilizing the exposure regulator.

This is accomplished, in accordance with the invention, by arranging the diaphragm and diaphragm adjusting mechanism together with its actuating member on an adjustable carrier, which latter is manually shiftable and can be set at different relative positions with respect to the driving member of the exposure regulator, all for the purpose of taking into consideration the said additional exposure factors, such as shutter speed and film sensibility or sensitivity. Also, in conjunction with the foregoing, the connection between the driving member of the exposure regulator and the actuating member of the diaphragm is constituted as a uni-laterally or uni-directionally acting drive mechanism, by means of which the diaphragm is adjusted in response to movement of said driving member from an end position, associated with either the smallest or else the largest aperture, into an adjusted or regulated position which corresponds to the prevailing light intensity and to the setting of the additional exposure factors.

A camera as thus constructed in accordance with the invention has special importance in that the setting values of all exposure factors except light intensity and diaphragm, are expressed in the relative position of the said actuating member of the diaphragm and the driving member of the exposure regulator, so that the setting of the diaphragm by the exposure regulator is effected in accordance with "genuine" light values. This is of considerable advantage in connection with the construction of the exposure regulator, since it is possible to use a regulating or control device of any nature or type whatsoever, as for example one in the form of a moving coil instrument. Furthermore, there is additional importance and benefit in the fact that no additional force or basic changes with respect to the construction and operation of the diaphragm are required, in order to obtain the above improvement. Rather, it is possible to use diaphragm systems of any kind or type.

For the purpose of taking into consideration various shutter speeds and film sensitivities the diaphragm adjustment is arranged, in an economical and operationally favorable manner, to include a two-part setting member, one part of which constitutes the exposure time or speed setting member of the camera while the other part is fixedly connected to the above mentioned carrier of the diaphragm mechanism and is settable at different relative positions with respect to the speed setting member, using in conjunction with this a film sensitivity scale and a setting or index mark which cooperates with the latter.

Another construction as provided by the invention, which is directed at enlarging the scope of use of the camera, provides a manually operable switch or selector which is settable at "automatic" and "non-automatic" positions and by means of which the exposure regulator can be disconnected or rendered inoperative and the diaphragm can be converted for manual adjustment.

The exposure regulator can be disconnected or rendered inoperative in a simple and reliable manner, in accordance with the invention, by the provision of a locking device which is made operative in response to the selector being set at the "non-automatic" position, and for such settings the driving member of the exposure regulator is retained in an initial or starting position, wherein its control influence is nullified.

The selector device itself may serve as the manually operable member for manually setting or adjusting the diaphragm, and for this purpose it is associated with a diaphragm scale and an index mark cooperating with the latter, the said scale and index mark being cooperably arranged so that one or the other is on the selector or on a member connected to the adjustable carrier of the diaphragm.

The simultaneous use of the selector as the manually operable diaphragm setting member provides the advantages of economy and simplicity in the camera structure.

Important advantages as regards the obtaining of a simple, reliable and economical structure in the camera are had by constituting the connection between the diaphragm actuating member and the driving member of the exposure regulator, and between such actuating member and the selector which serves to manually adjust the diaphragm, as a pivotal lever which, for the "automatic" position of the selector is influenced or controlled by the driving member of the exposure regulator and which for the "non-automatic" position is influenced or controlled by the selector for the purpose of manually setting the diaphragm.

An additional advantage is obtained with respect to good adaptability of the setting device to the respective structure of the camera, when the carrier of the diaphragm is constituted as a ring or disk, as well as the diaphragm actuating member and also the selector device, said rings or disks being arranged coaxially with respect to the optical axis of the camera.

Optimal operational simplicity and dependability, as regards the taking of successful photographs, is further had by the provision of an indicating or warning device which cooperates with the exposure regulator and is preferably visible in the finder of the camera, said warning device enabling an indication to be given as to whether an exposure setting is possible which is within the operating range of the camera for the prevailing light intensity and the selected setting of the other exposure factors. The said indicating or warning device is variable in its relative position with respect to the light intensity measuring device of the regulator, being shifted in response to the adjusting movement of the setting members which adjust for shutter speed and other additional exposure factors.

The special advantage of this further construction as provided by the invention resides in the fact that the operator need, in addition to focusing on the object which is to be photographed and possibly setting the camera for the correct distance, merely look at the indicating or warning device and ascertain that it indicates a satisfactory condition.

The indicating or warning device may be constructed in various ways. Such devices, constituted in different manners, are well known. However, by the present invention there is provided an indicating device which is especially easily understood, simple in construction and dependable in operation, such device being characterized by two movable limiting marks or members which are associated with the needle or pointer of a well-known galvanometer, such needle appearing in the viewing window of the camera together with the two said limiting marks or members. Such marks are adapted, as regards their adjusting motion, to the galvanometer characteristic of the means of suitable control devices, as for example cams, which are provided between the marks and the setting members for the additional exposure factors in such a manner that at each setting position they identify or define the possible or acceptable operating range of the camera by the space or zone extending or located between them.

An embodiment of the invention is illustrated in the accompanying drawings, in which:

FIG. 3 reveals details of the diaphragm structure and the setting devices provided for the latter, as located in the shutter assemblage.

FIG. 6 is a view similar to that of FIGS. 4 and 5, but showing the camera adjusted for effecting manual regulation of the diaphragm.

FIG. 7 is a fragmentary diagrammatic representation like that of FIGS. 4, 5 and 6, illustrating the position of portions or components of the automatic diaphragm setting device while a photograph is being effected using a manual diaphragm setting.

FIG. 8 is a diagrammatic representation of the structure of the indicating device and the mode of operation thereof, as provided in accordance with the invention.

Figure 1:
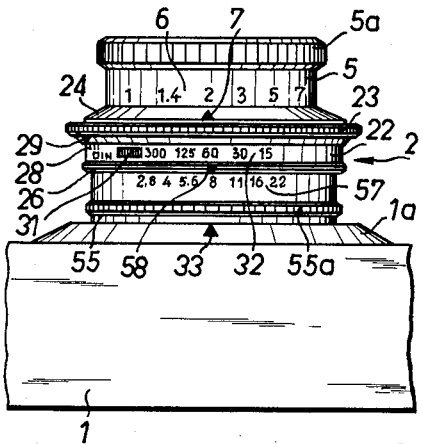
FIG. 1 is a top plan view of a portion of a photographic camera having an intra-lens shutter assemblage, in which there is provided a diaphragm mechanism constructed in accordance with the invention. A selector and manual diaphragm setting member cooperating with the diaphragm is shown in the "manual" or "non-automatic" position.

Referring to FIGS. 1–7, the housing or case of the camera is indicated by the numeral 1. The case 1 has a front plate 1a affixed to it, in which there is a circular opening 1b (FIG. 3) to accommodate in the well-known manner the mounting means of a photographic intra-lens shutter assemblage 2. The said assemblage has an externally threaded short tubular nozzle 3a provided on the rear of a shutter housing 3, said nozzle extending through the opening 1b and being secured in place by means of a threaded ring 4 which is screwed on the external threads of the nozzle.

At the front of the shutter assemblage 2 there is provided a range or distance setting ring 5, having a knurled knob or periphery 5a (FIGS. 1 and 2), said ring being settable with respect to a stationary index mark 7 and having a range or meter scale 6 cooperable with the said mark.

Within the shutter housing 3 there is provided, in the well known manner, a base plate 8 having a tubular portion or nozzle 8a serving to position and carry the well-known members of the shutter mechanism (which are not shown herein for the sake of clarity of illustration). A clearance space 8b is provided at the rear of the base plate 8a, to accommodate the shutter blades 9. The positioning and actuation of the shutter blades is effected in the usual manner, by means of pins 10 and 11, the pins 10 being affixed to the base plate 8a whereas the pins 11 are carried on a shutter blade driving ring 12.

In addition, there is provided a clearance space 3b for the diaphragm mechanism to be described later, said space being located at the inside of the rear wall of the shutter housing 3. For the purpose of automatically setting the diaphragm in response to operation of the exposure regulator, the diaphragm mechanism has an actuating member which is connected or coupled to a driving member of the exposure regulator.

The said exposure regulator, in the illustrated embodiment of the invention, has a sensing member (which is to be described latter) which permits sensing in a well-known manner the position of the movable member of a measuring mechanism constituting part of the electric exposure meter which is built into the camera, such sensing taking place in response to actuation of a camera release 14 (FIGS. 4–7).

In accordance with the present invention the diaphragm mechanism and its actuating member are arranged on an adjustable carrier, which latter is manually operable or shiftable and is settable in different relative positions with respect to the driving member of the exposure regulator, for the purpose of taking into consideration additional exposure factors, such as the factors of shutter speed and film sensitivity. The connection of the driving member of the exposure regulator with the actuating member of the diaphragm is effected by a uni-laterally or uni-directionally acting driving mechanism, through the medium of which the diaphragm is adjusted in response to movement of the driving member, from an end position associated with either the smallest or else the largest diaphragm aperture into an adjusted position which corresponds to the prevailing light intensity and to the setting of the additional exposure factors.

In the illustrated and described embodiment of the invention, the carriers for the diaphragm mechanism and for its actuating member are constituted of two movable fixedly interconnected disks 15 and 16 which are arranged coaxially with respect to the optical axis and are located in the opening or recess 3b (FIG. 3) of the rear wall of the shutter housing 3. Fixed on the disk 15 are pins 17, about which sector-like diaphragm segments or lamellas 18 are pivotally mounted. The diaphragm segments 18 have pin-and-slot connections 18a, 19 with a rotatable actuating ring 20 which is guided or has a bearing on the disk 16. The ring 20 is urged in the direction which effects the largest diaphragm aperture by means of a light spring 21.

The disks 15 and 16 are manually shiftable and can be positioned or placed in different relative positions with respect to a driving member of the exposure regulator (which is to be described later) for the purpose of taking into consideration additional exposure factors, such as the factors of shutter speed and film sensitivity. For this purpose, the disks 15 and 16 are connected to an externally operable setting member which comprises two rings 22 and 23 arranged concentrically with respect to the optical axis. The ring 22 comprises the exposure time or speed setting ring of the shutter assemblage, whereas the ring 23 is fixedly connected to the disks 15, 16 and can be placed in different relative positions with respect to the speed setting ring 22 by means of a suitable coupling, such positions being calibrated by a film sensitivity scale 28 and a setting or index mark 29 cooperating with the said scale.

Considering further details of construction, the rings 22 and 23 are provided on and located at the front side of the shutter housing 3. The rings are held against axial movement in a well-known manner, by means of a front plate 24 which is secured in position by a ring 25 screwed onto external threads provided on the tubular portion 8a of the base plate 8.

Figure 3:
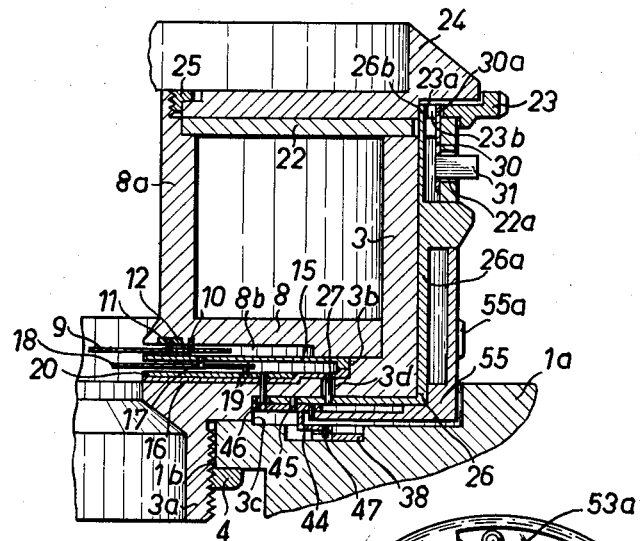
FIG. 3 is an axial fragmentary sectional view through the intra-lens shutter assemblage shown in FIGS. 1 and 2.

A connection between the ring 23 and the disks 15, 16 is established by means of an additional ring 26 which is positioned on a shoulder 3c on the rear wall of the shutter housing 3, the shape of such shoulder being shown in FIG. 3. In effecting this connection, a projection 26b is provided on the cylindrical body 26a of the ring 26, said projection being received in a correspondingly shaped opening or recess 23a of the ring 23. The cylindrical body 26a extends around the side wall of the shutter housing 3, as clearly seen in FIG. 3. The connection with the disks 15, 16 on the other hand is established by means of a pin 27 inserted into the disk 16 and the ring 26. A clearance slot 3d for the pin 27 is provided in the rear wall of the shutter housing 3, as shown.

The aforementioned film sensitivity scale 28 which serves to indicate the relative settings of the rings 22 and 23 is arranged, in the illustrated embodiments of the invention, on the speed setting ring 22 and the ring 23 carries the setting or index mark 29 associated with said scale. In order to releasably hold the two rings in their respective relative setting positions, a manually operable notched coupling device is provided between such rings. The coupling device comprises a spring blade 30 which is uni-laterally affixed on the inner circumference of the ring 22 and which cooperates, by means of a projection 30a provided on it, with detent openings 23b provided in the ring 23, said openings being correlated with the film sensibility or sensitivity values of the scale 28. To actuate the coupling device, the spring blade carries on its free end a fingerpiece 31 which passes outwardly through a clearance slot 22a provided on the ring 22. Also arranged on the ring 22 is an exposure time or speed setting scale 32, which is cooperable with a setting mark 33 provided on the front plate 1a of the camera.

The sensing member 13 of the exposure regulator shown in FIGS. 4 to 7 is movable vertically as seen in these figures, being acted on by a compression spring 34 which tends to maintain it in engagement with a collar or flange 14a provided on the camera or shutter release member 14. The spring 34 is weaker than and may be overcome by a spring 35 which influences the shutter release 14, so that the sensing member 13 occupies the position shown in FIGS. 4 and 6 when the release is in its normal, inoperative position. For the purpose of cooperating with a movable member of the measuring mechanism of the exposure regulator, the sensing member 13 has a stepped setting cam 13a, which is engageable (upon the shutter release 14 being actuated) under the action of the spring 34 with the needle or pointer 37 connected to the movable member of the measuring mechanism. As shown, the needle 37 is shiftable along, and is supportable by a stationary stop or table piece 36. Preferably the needle 37 is clamped or held in its adjusted position by means of a suitable clamping device, various types of which are well known as well as the modes of operation of the same. The position of the needle 37, and hence the extent of travel of the sensing member 13 during the automatic diaphragm setting operation depends on the light intensity which prevails when the photograph is taken.

Figure 4:
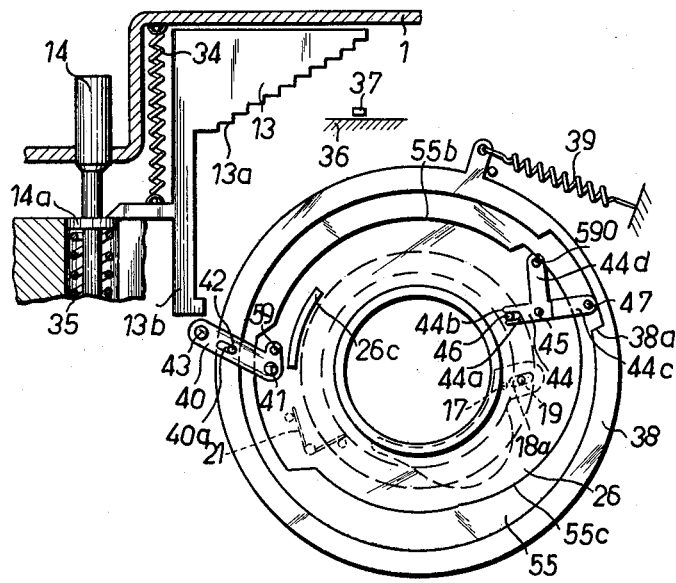
FIG. 4 is a diagrammatic representation, partly in elevation and partly in vertical section, of the structure of the diaphragm and setting devices involved with the "automatic" and "non-automatic" diaphragm setting. The mechanism for effecting an automatic diaphragm setting is shown in the operative position.
Figure 5:
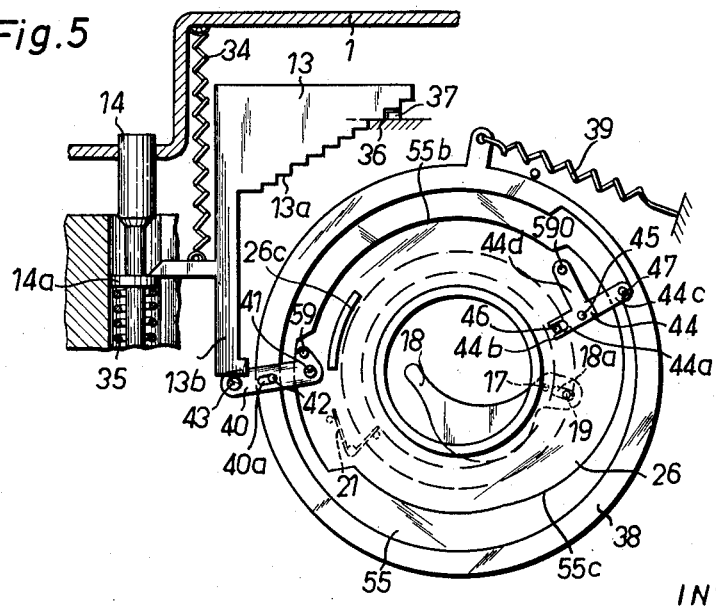
FIG. 5 is a view like that of FIG. 4 but showing the positions of the components after automatic setting of the diaphragm has been effected.

The sensing member 13 is arranged to influence or control a driving ring 38 which may be drivingly connected to the diaphragm actuating ring 20, the driving ring 38 being concentric with respect to the optical axis and being yieldably held in the starting position shown in FIGS. 4 and 6 by means of a light spring 39. The actuation of the ring 38 by the sensing member 13 is effected through the medium of a lever 40 which is pivotally movable about a fixed axis or pin 41 provided on the camera. To establish the connection with the driving ring 38, the lever 40 has a slot 40a arranged to receive a pin 42 affixed to the driving ring. The lever 40 also carries on its free end a pin 43 which is located in the path of movement of a portion 13b of the sensing member 13. The lever 40 is thereby pivoted during the sensing movement of the sensing member 13 which occurs in response to actuation of the shutter release 14. The starting position of the sensing member 13 is illustrated in FIG. 4, and such member moves downward, for example, to the adjusted position of FIG. 5 whereby the driving ring 38 is turned counterclockwise against the action of the return spring 39. The extent of movement of the sensing member 13 and of the driving ring 38 thus has a fixedly predetermined relationship.

The connection between the driving ring 38 and the diaphragm actuating ring 20 is established, as already mentioned, by means of a uni-directionally acting driving mechanism. In FIGS. 3–7 such mechanism is seen to comprise a lever 44 which is pivotally mounted about an axis 45 provided on the transmission ring 26. One arm 44a of the lever 44 has a pin-and-slot connection 44b, 46 with the diaphragm actuating ring 20, whereas a pin 47 affixed to the other arm 44c of the lever is disposed in the path of movement of a stop or shoulder 38a provided on the driving ring 38.

The relative position of the pin 47 with respect to the stop or shoulder 38a is variable in response to the adjustment of the setting rings 22 and 23 provided for the shutter speed and film sensitivity. Adjustment of such setting rings causes the shoulder 38a to engage, upon the shutter release 14 being actuated, either at once or after a shorter or longer preliminary movement the pin 47 of the lever 44 and to thereby pivot the latter for the purpose of closing the diaphragm to a diaphragm aperture value which is determined by the shutter speed and the film sensitivity as well as by the light intensity which prevails at the time the photograph is taken.

Figure 9:
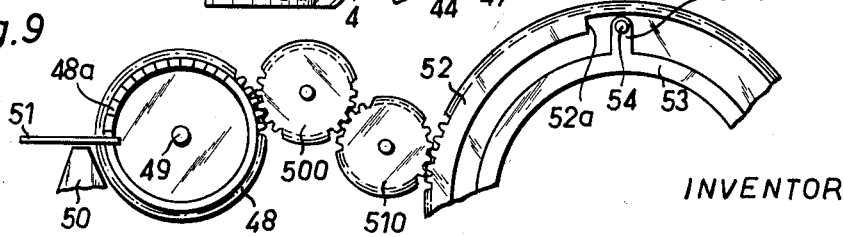
FIG. 9 is a diagrammatic representation of an automatic diaphragm setting device of a type different from that illustrated in FIGS. 4–7.

While the exposure regulator shown in FIGS. 3–7 as described above is provided especially for diaphragm devices or systems which have a comparatively short total adjusting path of movement of the diaphragm actuating member, the exposure regulator shown in FIG. 9 can be used in those cases where there is a longer total adjusting path of the diaphragm actuating member. As seen in this figure, the sensing member is constituted in the form of a rotatable cylinder or roller 48 which is turnable about an axis 49 provided on the camera. To effect cooperation with the movable member of the measuring mechanism of the exposure meter, the cylinder 48 has, in the same manner as the sensing member 13, a stepped setting cam 48a, by means of which it engages (upon the camera release 14 being actuated and under the action of a spring not shown) a needle 51 which is connected to the movable member of the measuring mechanism and which is arranged to be clamped against a fixed stop or table member 50. A diaphragm driving ring 52 is connected to the sensing cylinder 48 by means of a transmission gear train comprising two gears 500 and 510. The said driving ring 52 is connected, as in the case of the driving ring 38, with a diaphragm actuating ring 53 by a driving mechanism. The driving mechanism comprises a pin 54 which is affixed to an arm 53a of the ring 53 and which is located in the path of movement of a shoulder 52a provided on the driving ring 52.

For the purpose of effecting versatile use and applicability of the camera as provided by the invention, means are provided whereby the setting of the diaphragm can be carried out not only by the above described automatic setting mechanism but also by manual means. In accordance with a further construction as provided by the invention, this is effected by the provision of a manually operable switch or selector device, which can be set at "automatic" and "non-automatic" positions and by means of which the exposure regulator can be switched off or rendered inoperative and the diaphragm can be converted for manual adjustment.

This organization makes it possible to use a camera as provided by the invention, for carrying out photographs or exposures in which the light conditions are different prior to and during the exposure. This is, for example, the case with flash exposures.

Figure 2:
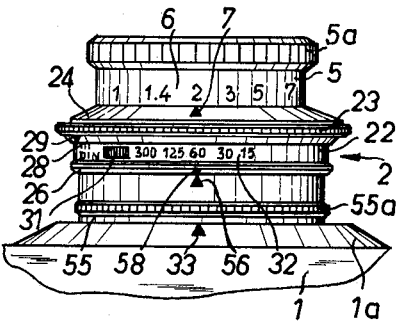
FIG. 2 is a view similar to that of FIG. 1, but showing the selector member in the "auto" or automatic position.

The selector device, as shown in the illustrated embodiment of the invention, comprises a rotatable ring 55 which is concentric with respect to the optical axis and which bears on the transmission ring 26 and has a knurled knob 55a. To indicate its various settings, the ring 55 carries a setting or index mark 56 identified with the word "auto," as well as a diaphragm scale 57 which is associated with the word "manual." The mark 56 and the scale 57 with the associated mark or word are settable with respect to an index mark 58 which is provided on the transmission ring 26 (FIGS. 1 and 2).

The switching off or rendering inoperative of the exposure regulator to render the same inoperative upon setting the selector 55 at the setting position associated with the sign "manual" is effected, in the illustrated embodiments of the invention, in a simple manner by retaining the driving ring 38 in the starting position shown in FIG. 6. For this purpose, the lever 40 which establishes the connection between the driving ring 38 and the sensing member 13 has a pin 59 which, upon the "manual" setting being effected, engages a segment 55b of the reversing or selector ring 55 in the manner shown in FIG. 6. Thus, when the camera release 14 is actuated, the members 13 and 38 are retained in a starting position wherein their control influence on the diaphragm is eliminated or nullified.

To provide for control of the diaphragm in the case of a manual setting of the selector device, the reversing or selector ring 55 is provided with a cam 55c, to which the diaphragm actuating ring 20 can be coupled. Such coupling is established without additional cost by means of the aforementioned lever 44 which for this purpose is provided with a pin 590 carried by a third arm 44d of the lever, such pin being engageable with the cam 55c. The spring 21 which biases the diaphragm actuating ring 20 in a counterclockwise direction as viewed in FIG. 6, tends to maintain the pin 590 carried by the lever arm 44d in engagement with the cam edge 55c, as will be understood.

The use of the cam 55c, provided on the selector ring 55 for the purpose of adjusting the diaphragm in the case of the camera being set for manual diaphragm adjustment, makes it possible to obtain a greater adjusting movement of the setting ring 55, as compared to the adjusting movement of the diaphragm actuating ring 20, all in an especially simple and economical manner. This results in the advantage that the diaphragm scale 57 as provided on the ring 55 may be of the expanded type, covering a large portion of the circumference, whereby it is easily readable and understandable, and promotes an accurate manual setting or adjustment of the diaphragm.

FIG. 8 shows a further construction as provided by the invention, involving the provision of a warning or signal device which makes possible a camera the operation of which is particularly easily understood, thereby tending to insure the successful taking of photographs. In accomplishing and carrying out the foregoing there is provided a novel warning or signaling device which cooperates with the exposure regulator and which indicates, preferably in the finder of the camera, whether or not the prevailing light intensity and the selected setting of the additional exposure factors is satisfactory to effect a proper exposure within the operating range of the camera. The relative positions of the indicating members of this indicating device with respect to the exposure regulator is variable in response to the adjusting movement of the speed and/or film sensitivity setting members 22, 23 and thus the giving of a warning signal is controlled in response to such adjusting movement of these setting members.

The light intensity measuring device, as shown in the illustrated embodiment of the invention, comprises a well-known galvanometer 60 which is located in the circuit of a photoelectric cell 61. Also located in this circuit is a balancing resistor 62. The needle 60a of the galvanometer is arranged in a viewing window 63 which is preferably located in the field of the camera finder or is reflected into the finder in a well-known manner. The indicating device or warning device comprises two movable limiting marks or members 64 and 65, which are visible in the viewing window and which cooperate with the needle 60a in the manner indicated. The members 64 and 65 are adapted, as to their adjusting movement, to the characteristic of the galvanometer 60 by means of suitable control and transmission devices arranged between the limiting members and the speed and film sensitivity setting members 22, 23 whereby the limiting members identify or define the possible operating range of the camera for each setting position, by the space located between the members. This space or distance has been given the reference letter "B" in FIG. 8.

The two limiting members 64 and 65 are constructed in the form of needles which are pivotally movable and arranged to be coaxial or concentric with the needle 60a of the galvanometer. To effect adjusting movement of the limiting members 64 and 65 in response to adjustment of the shutter speed and film sensitivity setting members 22, 23 a control device is associated with each of the limiting members. Each of such control devices comprises a cam and a cam follower cooperating with the said cam. In the illustrated embodiment of the invention, cams 66 and 67 are illustrated, fixedly connected to a gear 68. For the purpose of cooperating with the cams 66 and 67, the limiting members 64 and 65 have follower pins 69 and 70, said pins being maintained in engagement with the cams by springs 71 and 72 connected with and acting on the limiting members 64 and 65 as shown. The cams 66 and 67 are actuated by means of a transmission device, in response to movement of a cam 26c which is provided on the transmission ring 26 and which turns with the carrier comprising the members 22, 23. The cam 26c is engaged by a follower pin 74 which is longitudinally movable in a guide or bushing 73 and which at its other end engages a bell crank 76 pivotally mounted about an axis 75. The movement of the bell crank 76 is transmitted, by means of another transmission pin 78 longitudinally movable in a guide or bushing 77, to a gear 79 which meshes with the gear 68. A spring 81 arranged on the axis 80 of the gear 79 effects a unidirectionally positive driving engagement between the cam 26c and the gear 79.

I claim:

1. In a photographic camera, in combination, an adjustable diaphragm; an exposure regulator; coupling means including a driving member connected with the regulator and an actuating member connected with the diaphragm, for effecting automatic adjustment of the latter; a mounting means for the diaphragm and said actuating member, comprising a manually shiftable, adjustable carrier variously positionable with respect to said driving member, on which the diaphragm and actuating member are mounted and carried, said mounting means and carrier enabling adjustment of the diaphragm to be effected for taking into consideration exposure factors other than the diaphragm setting, said coupling means including further a tensional, unidirectionally positive separable driving connection between said driving and actuating members whereby the diaphragm may not only be shifted automatically from a starting end position to an adjusted position as determined by existing light conditions but also shifted manually by actuation of said carrier for considering said other exposure factors.

2. A camera as in claim 1, in which there is a two-part manually operable setting member the parts of which are relatively adjustable, one part being fixedly and immovably connected to the said carrier for the diaphragm and diaphragm actuating member and the other part constituting the speed setting member of the camera, and in which there are associated with said two parts a film sensitivity scale and a setting mark.

3. A camera as in claim 1 in which the exposure regulator has a light intensity measuring device, and in which there is an indicator device cooperable with the exposure regulator and having a movable portion which is adjustably positionable, with respect to said measuring device, in response to movement of the said carrier whereby said movable portion will indicate whether an exposure setting within the operating range of the camera is possible at the prevailing light intensity and at the selected setting of the carrier.

4. A camera as in claim 3, in which the exposure regulator comprises a galvanometer having a needle, in which there is a viewing window in which the needle is disposed, in which the movable portion of the indicator device is cooperable with said needle and comprises two movable limiting members disposed in said window, in which there are control cams actuated by said carrier for adjustably positioning said limiting members, said members being adapted to the characteristics of the galvanometer by said cams, said limiting members defining between them the satisfactory operating range of the camera for each setting position of the carrier.

5. In a photographic camera, in combination, an adjustable diaphragm; an exposure regulator; coupling means including a driving member connected with the regulator and an actuating member connected with the diaphragm, for effecting automatic adjustment of the latter; a manually shiftable, adjustable carrier variously positionable with respect to said driving member, on which the diaphragm and actuating member are carried, said carrier enabling adjustment of the diaphragm to be effected for taking into consideration exposure factors other than the diaphragm setting, said coupling means including further a tensional, unidirectionally positive driving connection between said driving and actuating members whereby the diaphragm may not only be shifted automatically from a starting end position to an adjusted position as determined by existing light conditions but also shifted manually by actuation of said carrier for considering said other exposure factors; a manually operable selector member settable in "automatic" and "non-automatic" positions; control means responsive to positioning of the selector member in "non-automatic" position for rendering inoperative said driving member; and movement transmitting means responsive to positioning of the selector member in the said "non-automatic" position, effecting a connection between the said member and the diaphragm actuating member to enable manual setting of the diaphragm to be accomplished.

6. A camera as in claim 5, in which the control means comprises a locking device rendered operative when the selector member is in the "non-automatic" position, for locking the said driving member in an initial starting position wherein the said tensional connection is inoperative.

7. A camera as in claim 5, in which there is a part connected to and movable with the said carrier, and in which there are cooperable scale means indicating diaphragm values, disposed on the selector member and the said part.

8. A camera as in claim 5, in which the said tensional connection and movement transmitting means comprises a pivoted lever which is actuated respectively by the driving member and the selector member for the "automatic" and "non-automatic" positions of the latter.

9. A camera as in claim 5 in which the carrier, the diaphragm actuating member, the driving member and the selector member are constituted as rings which are coaxial with respect to the optical axis of the camera.

References Cited in the file of this patent

UNITED STATES PATENTS

| | | |
|---|---|---|
| 2,780,971 | Fahlenberg | Feb. 12, 1957 |
| 2,913,969 | Faulhaber | Nov. 24, 1959 |
| 2,920,542 | Engelsmann | Jan. 12, 1960 |
| 2,923,216 | Greger | Feb. 2, 1960 |